May 22, 1945. A. S. BROWN 2,376,336
RELEASING DEVICE
Filed April 20, 1942 2 Sheets-Sheet 1

Inventor
Arthur S. Brown
By G. J. Kessenich & J. H. Church
Attorneys

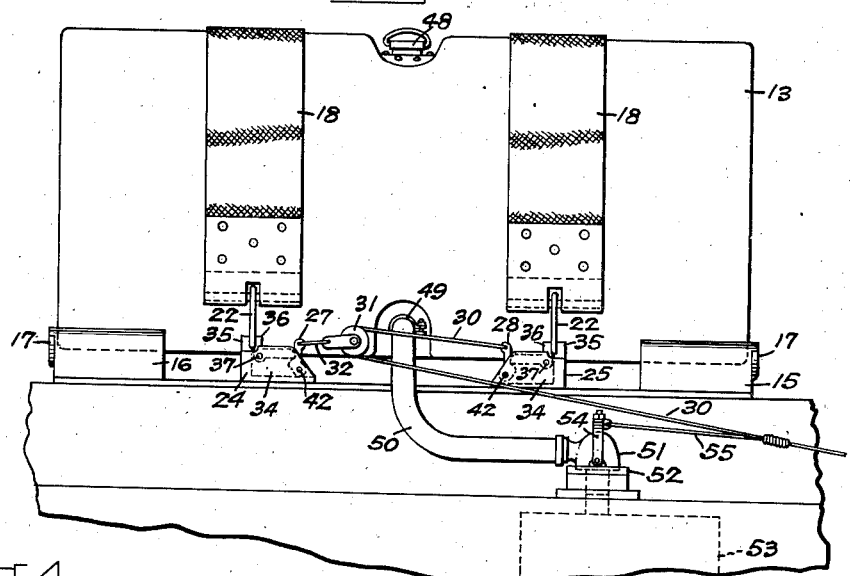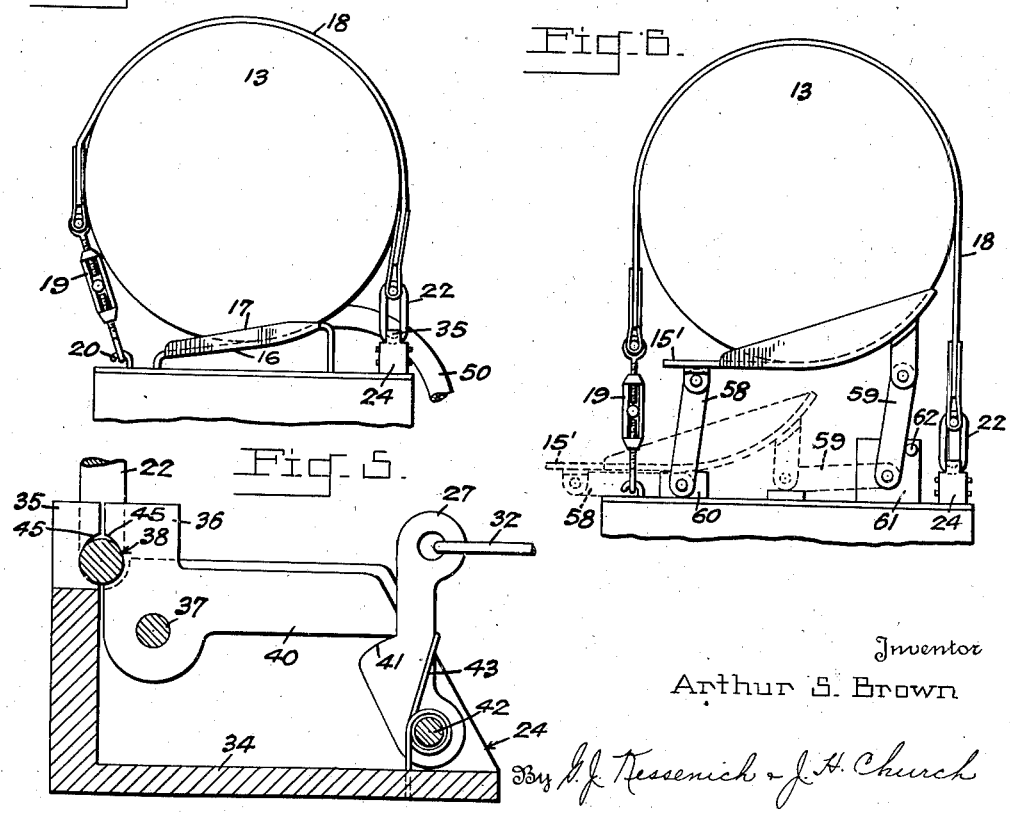

Patented May 22, 1945

2,376,336

UNITED STATES PATENT OFFICE 2,376,336

RELEASING DEVICE

Arthur Smith Brown, United States Army,
Aberdeen Proving Ground, Md.

Application April 20, 1942, Serial No. 439,718

8 Claims. (Cl. 280—5)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to releasable supports for vehicle accessories, and is concerned particularly with external auxiliary tanks adapted, normally, to augment normal fuel storage facilities, the tanks being releasable from the vehicle when empty or when operating conditions are such that the external tank forms an undesired obstruction.

It is known that quick release mechanisms have been provided for suspended bodies on vehicles of various types, such arrangements also, as necessary, including separable conduit connections between the vehicle and the suspended body. It is an object of the present invention to provide an auxiliary tank or body which normally is supported on a cradle on the vehicle rather than being suspended, the tank being anchored by straps which are releasable from a remote point on the vehicle. A further object is to provide certain alternate arrangements of releasing mechanisms. Still another object is to provide coincidentally operable devices for releasing a tank and for separating the conduit normally connecting the tank with the vehicle. An added object is to provide an auxiliary fuel tank disposed above the normal vehicle tank, the auxiliary tank being so connected to the other that filling of both tanks may be accomplished by introducing liquid into the auxiliary tank alone.

Figure 1:
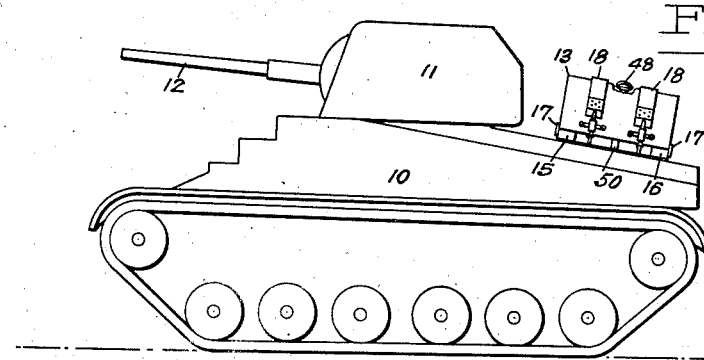
Figure 2:
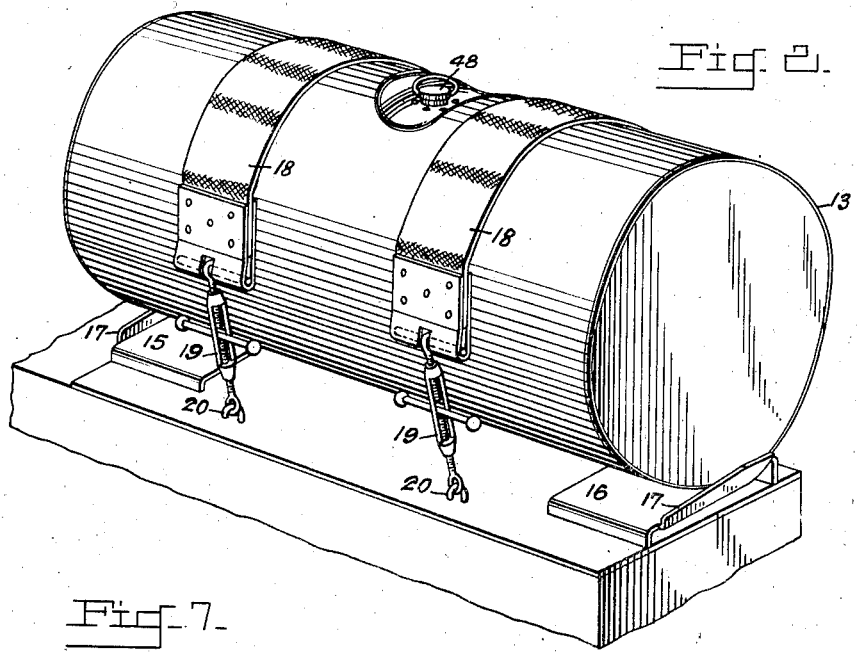
Figure 7:
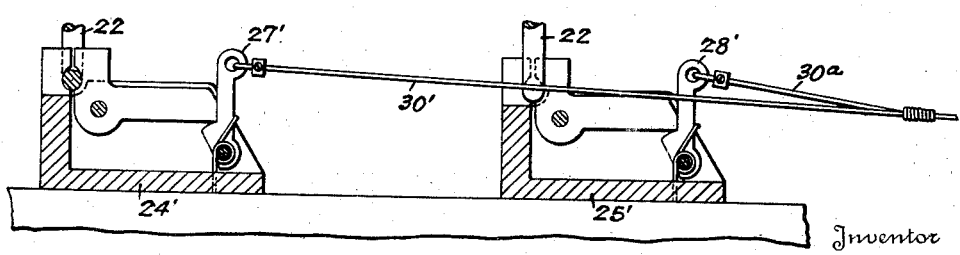

Further objects of the invention will become apparent in reading the detailed description below in connection with the drawings, in which:

Fig. 1 is a side elevation of a combat vehicle showing the location of an auxiliary fuel tank thereon, Fig. 2 is a perspective view of an auxiliary tank installation, Fig. 3 is a side elevation of the tank showing release gear therefor, Fig. 4 is an end elevation of the tank and support, Fig. 5 is an enlarged sectional view of part of the release gear, Fig. 6 is an end view of a tank showing an alternate form of collapsible support, and Fig. 7 is a sectional view of an alternate form of release gear.

Referring briefly to Fig. 1, a tracklaying combat vehicle 10 is shown, the central portion of its upper deck having a rotatable turret 11, equipped with a gun 12. On the rear portion of the vehicle deck, a fuel tank 13 is mounted. Under normal road running conditions, the turret 11 is not rotated, and the auxiliary fuel supply afforded by the tank 13 extends the operating range of the vehicle. However, when combat conditions are entered, the tank 13 becomes redundant, for it is vulnerable and also interferes with full turret traverse. Thus, the vehicle crew may jettison the auxiliary tank by remote control from within the vehicle.

The tank 13 rests upon sloped ramps 15 and 16 rigid with the vehicle 10, these ramps having end flanges 17 for axial location of the tank. Similar straps 18 embrace the tank, the outer ends of the straps as shown in Fig. 2 being clevised to turnbuckles 19 whose lower eyes are engaged by hooks 20 secured to the vehicle. The strap inner ends, as shown in Figs. 3 and 4, carry eyes 22 engaged by release assemblies 24 and 25 which are similar to one another but faced in opposite directions. The release assembly 24 carries a release arm 27, and the assembly 25, a release arm 28. A flexible cable 30, secured to the arm 28, passes over a pulley 31 and forward to the vehicle crew compartment, the pulley axle being connected to the arm 27 as at 32. By pulling the cable 30, the arms 27 and 28 are drawn toward one another, releasing the eyes 22 whereupon the straps 18 snap off the tank 13, release from the hooks 20 and fall to the ground, thus allowing the tank to fall to the ground under gravity influence.

Referring to Fig. 5, the assembly 24 (and likewise the assembly 25) comprises a base 34 to which a half-hook 35 is rigidly secured. Another half-hook 36 is pivoted to the support 34 at 37, matching with the half-hook 35 to form a passage 38 for the strap eye 22. The hook 36 carries an integral lever 40 whose outer end rests on a shoulder 41 on the arm 27, the latter being pivoted to the support 34 at 42. A spring 43 normally urges the arm leftwardly as shown at 27 so that the shoulder 41 engages the lever 40. By pulling on the cable 30, the arm 27 pulls the shoulder 41 away from the lever 40, allowing the latter to drop for release of the strap eye 22. The strap tension serves to open the hook 36 upon release thereof due to sloped portions 45 on the hooks 35 and 36.

Fig. 2 shows a tank filler cap 48 over the fuel filling opening, and an exit conduit 49 at the tank bottom. The conduit 49 as shown in Fig. 3 is secured to a hose 50 coupled to a cap 51 seated on a flange 52 at the vehicle surface, said flange providing a filler opening for the normal fuel tank 53 within the vehicle body. A bale 54, pivoted to the flange 52, holds the cap 51 in place on the flange. This bale is connected by a cable 55 to the tank release cable 30, and when the cable 30 is pulled, is displaced from cap holding engagement to allow the elements 50 and 51 to fall from the vehicle with the tank 13.

In some environments, the tank support ramps may protrude to such an extent as to cause interference with moving parts of the vehicle when prepared for combat by tank release. Fig. 6 shows a folding ramp to overcome this difficulty, the ramp plate 15' being supported by struts 58 and 59 pivoted at their upper ends to the plate and at their lower ends to the vehicle body at brackets 60 and 61. One of these brackets carries an abutment 62 against which a strut 59 bears. When resting against the abutment 62, the strut 59 is swung past a line parallel to the lines of action of the strap 18 so that, when the straps are tightened, the ramp struts cannot collapse. When the strap is released, however, the struts may fold to the left, as shown in Fig. 6 in dotted lines.

In Fig. 7, the release gear assemblies 24' and 25' are shown with their arms 27' and 28' at their right hand ends, respectively. The cable 30' is secured to the arm 27' and a cable conector 30a joins the cable 30' with the arm 28', whereby pulling of the cable 30' releases both release gears simultaneously without need for the pulley system shown in Fig. 3.

While I have described the present preferred embodiments of the invention, it will be apparent to those skilled in the art that various modifications and changes may be made in the structures shown. Any such modifications and changes are deemed to be within the scope of the invention, however, so far as they may be covered by the following claims.

I claim:

1. In a vehicle, a platform having a seat for a body, said platform being so disposed as to permit of gravity displacement therefrom of an unsecured body, an open hook on the vehicle, near the low side of the platform, a strap embracing the body when seated on the platform, having an eye at one end engaging said hook, and a release mechanism including means engaging the other end of said strap.

2. In a vehicle, a platform having a seat for a body, said platform being so disposed as to permit of gravity displacement therefrom of an unsecured body, an open hook on the vehicle, near the low side of the platform, a strap embracing the body when seated on the platform, having an eye at one end engaging said hook, an eye at the other end of said strap, a second hook on the vehicle engaging the second said eye, and means remote from the body operable to release said second eye from said second hook.

3. In a vehicle, a platform having a seat for a body, said platform being so disposed as to permit a gravity displacement therefrom of an unsecured body, an open hook on the vehicle, near the low side of the platform, a strap embracing the body when seated on the platform, having an eye at one end engaging said hook, an eye at the other end of said strap, a second hook on the vehicle engaging the second said eye, means remote from the body operable to release said second eye from said second hook, and means to place said strap in tension after engagement of its end eyes with said hooks.

4. In a vehicle, a ramp, a displaceable body disposed thereon and removed therefrom by gravity when released, a tension strap embracing said body at least in part, and devices on the vehicle to which the ends of said strap are secured, one of said devices being releasable from the strap from a remote point, and the other of said devices being releasable from the strap in response to release of the first device.

5. In a vehicle, a displaceable body disposed thereon and removed therefrom by gravity when released, a tension strap embracing said body at least in part, and devices on the vehicle to which the ends of said strap are secured, one of said devices being releasable from the strap from a remote point, and the other of said devices being releasable from the strap in response to release of the first device, said one device comprising a pivoted element having a first portion engaging part of the strap and an extended portion, and a movable member normally engaged with said extended portion and movable out of engagement therewith to allow release of said first portion from strap engagement.

6. In a vehicle, a displaceable body disposed thereon and removed therefrom by gravity when released, a tension strap embracing said body at least in part, and devices on the vehicle to which the ends of said strap are secured, one of said devices being releasable from the strap from a remote point, and the other of said devices being releasable from the strap in response to release of the first device, said one device comprising a pivoted element having a first portion engaging part of the strap and an extended portion, and a movable member normally engaged with said extended portion and movable out of engagement therewith to allow release of said first portion from strap engagement, and said other device comprising a cantilever projection on the vehicle over the open end of which a part of said strap is passed.

7. In a vehicle, a displaceable body disposed thereon and removed therefrom by gravity when released, a tension strap embracing said body at least in part, and devices on the vehicle to which the ends of said strap are secured, one of said devices being releasable from the strap from a remote point, and the other of said devices being releasable from the strap in response to release of the first device, said other device comprising a cantilever projection on the vehicle over the open end of which a part of said strap is passed.

8. In a body release mechanism on a vehicle, a pair of devices having means engaging the body and having triggering elements movable to disengage said means from the body a sheave secured to one triggering element, and a cable secured to the other triggering element reeved over said sheave and running substantially parallel to that run of the cable between the sheave and other triggering element.

ARTHUR SMITH BROWN.